United States Patent [19]

Younkin

[11] 3,849,896
[45] Nov. 26, 1974

[54] DIRECTIONAL GYRO INDICATOR SYSTEM

[75] Inventor: James R. Younkin, Fayetteville, Ark.

[73] Assignee: Edo-Aire Mitchell Industries, Inc., Mineral Wells, Tex.

[22] Filed: Apr. 3, 1972

[21] Appl. No.: 240,382

[52] U.S. Cl. .................................. 33/318, 74/5.7
[51] Int. Cl. ........................................... G01c 19/28
[58] Field of Search .......... 33/318, 317, 328; 74/5.7

[56] References Cited
UNITED STATES PATENTS

| | | | |
|---|---|---|---|
| 2,360,399 | 10/1944 | Chandler | 33/318 |
| 2,704,457 | 3/1955 | Gabrielson et al. | 33/318 X |
| 2,796,594 | 6/1957 | Chombard | 33/328 X |
| 3,091,127 | 5/1963 | Depp | 33/317 X |
| 3,455,030 | 7/1969 | Owens et al. | 33/318 |

*Primary Examiner*—William D. Martin, Jr.
*Attorney, Agent, or Firm*—Richards, Harris & Medlock

[57] ABSTRACT

A directional gyro indicator for aircraft having a barrel carrying a heading card at the front end of the barrel, with a directional gyro supported behind the barrel. A tracking disk rotatably mounted on a vertical outer gimbal axis of the gyro with a pickoff for detecting the angular displacement between the tracking disk and the outer gimbal. A transmission means coupling the disk and the barrel for equal rotation and a servo motor drive for the transmission means in response to the error signal from the pickoff for slaving the disk to the gyro.

16 Claims, 8 Drawing Figures

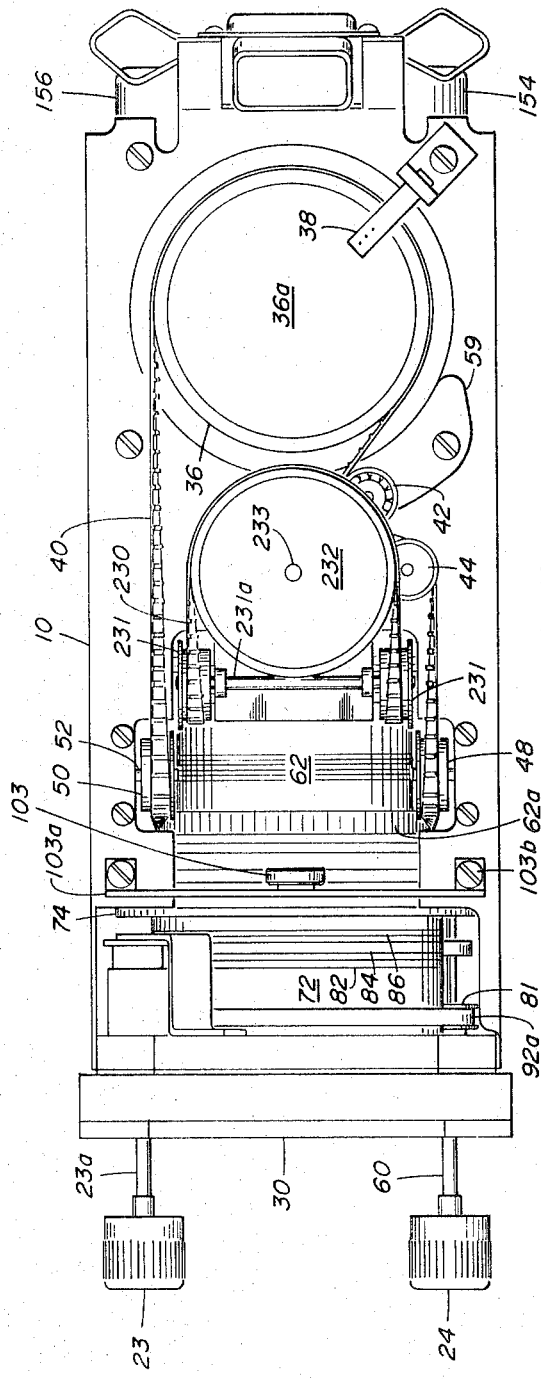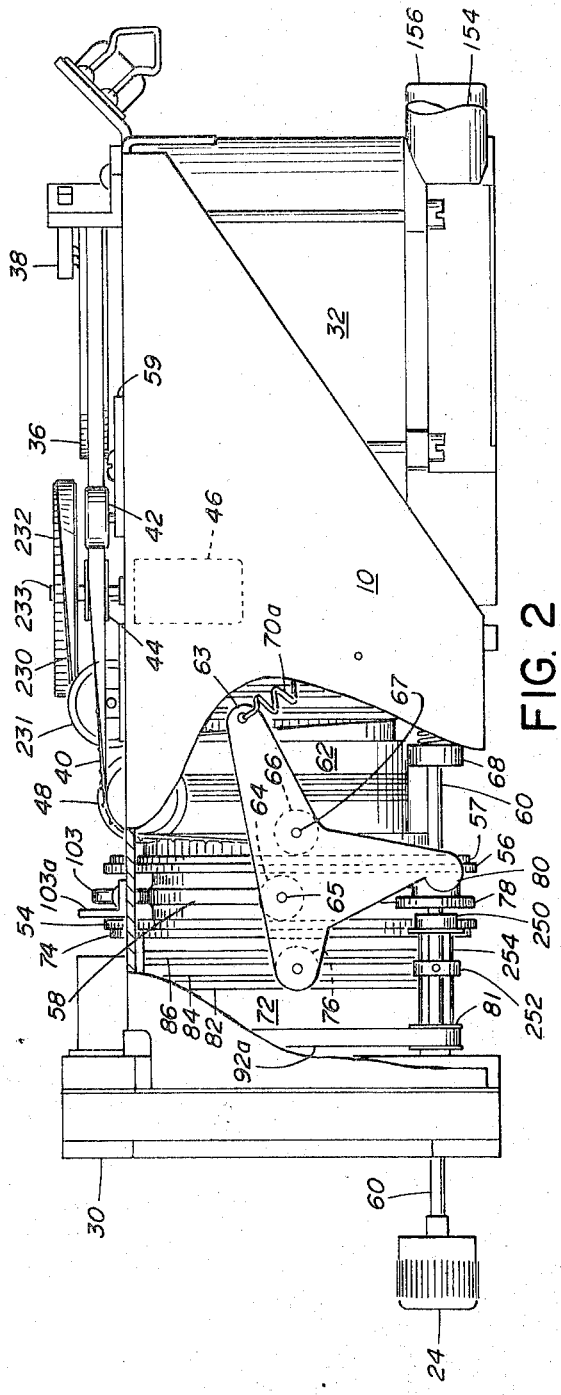

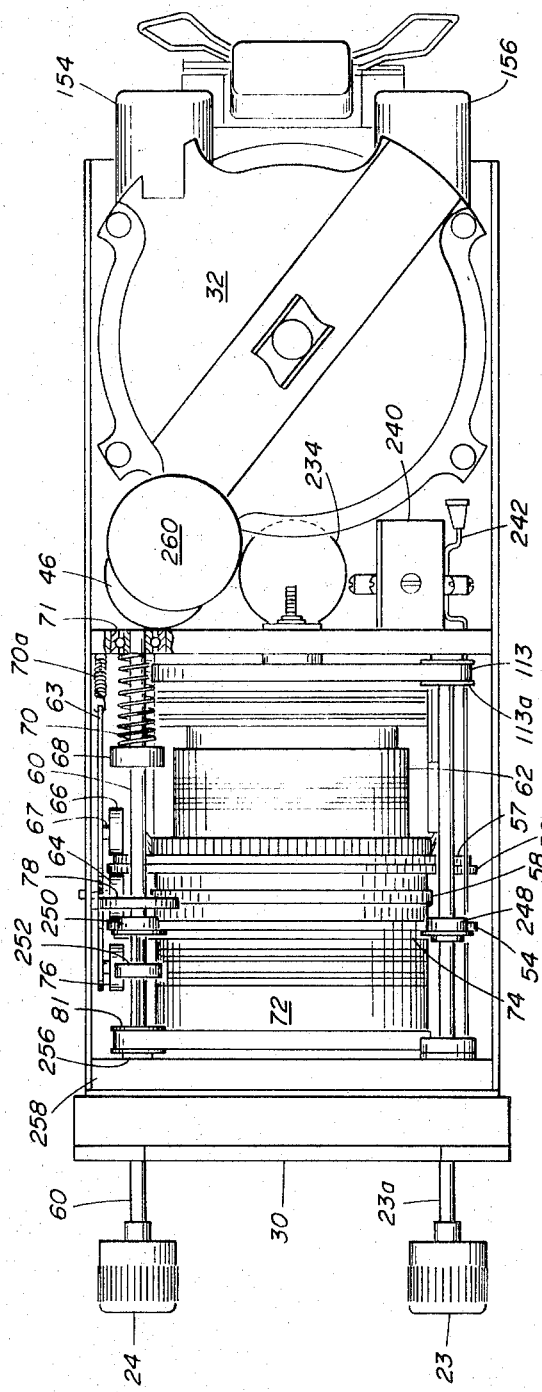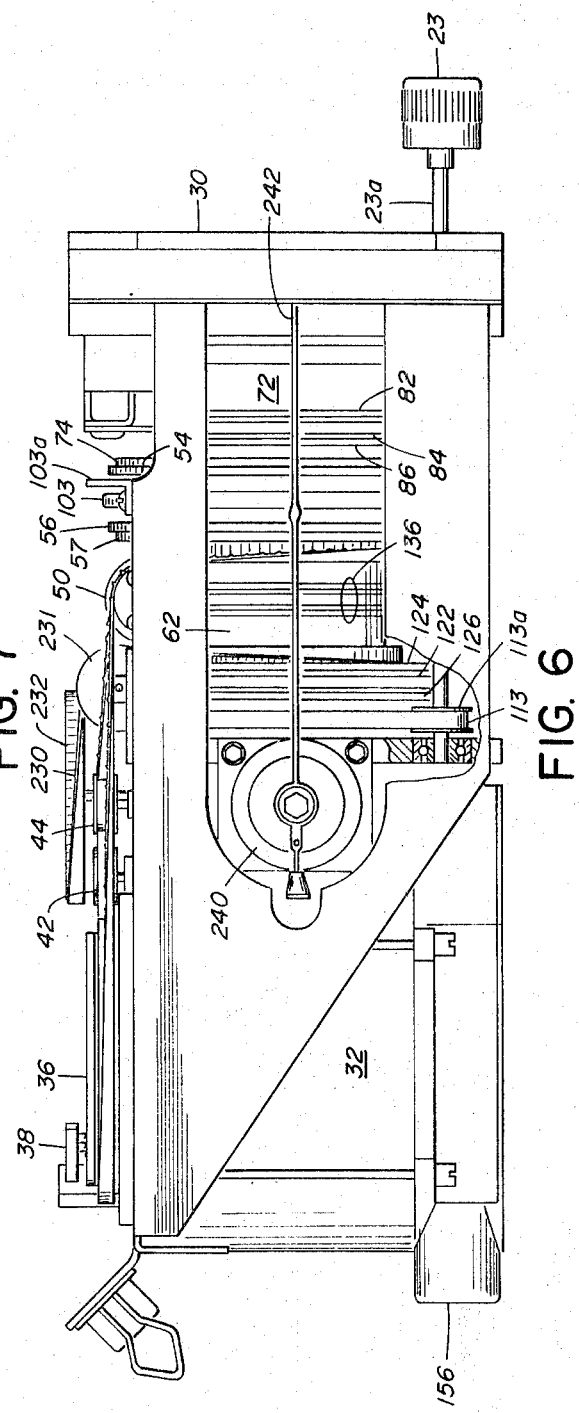

DIRECTIONAL GYRO INDICATOR SYSTEM

SUMMARY OF INVENTION

This invention relates to a direct readout directional gyro, and more particularly to the combination of a vertical gyro and a rotatable heading card with a unique linkage between the gyro and the heading card for setting the gyroscope and for heading selection.

In a further aspect, the invention relates to a releasable motor actuated belt drive which extends between a gyro tracking disk and a heading card and a radio display.

BACKGROUND OF INVENTION

Aircraft instrumentation is provided to assist the pilot in understanding flight situations at any instant. The utility of flight instruments is directly related to the ability to present information in a manner readily understandable and accurately indicative of the operation and attitude of an aircraft relative to a desired attitude or path either in elevation or in azimuth. Prior art systems have provided compact integrated displays which portray the horizontal situation of an aircraft in any one of several available modes.

Displays of the type to which the present invention is directed provide, in a single instrument such as would be mounted in the instrument panel of an aircraft, the following elements:

a. A heading card cooperating with a heading marker to provide for selection and indicating the aircraft heading in the heading mode. The card is in the form of a flat ring suitably graduated in a compass format on the face thereof. The marker is movable relative to the card for selecting a desired heading.

b. Centered in the ring is a radio display which provides a horizontal situation indication when in either localizer mode or omni mode. Basically, a meter movement is provided to be responsive to deviation from a radio path to indicate such displacement to the pilot. The movement of the meter needle across the face of the radio display indicates the extent of the displacement from the radio path.

c. A meter actuated unit responsive to a radio signal to provide a "to-from" indication to the pilot.

d. A meter actuated unit responsive to a radio signal to provide a glide slope indication on the face of the display.

The present invention is specifically directed to the first category above.

THE INVENTION

The present invention is directed to a method and arrangement of components for providing a display of the foregoing type but in which signal generation and coupling to the display elements is unique.

More particularly, in accordance with the present invention in one aspect, a direct readout directional gyro is provided for an aircraft wherein a housing is adapted to be mounted in an aircraft instrument panel having an exposed heading card therein which is rotatable about a predetermined axis. A gyroscope in the housing has a vertical output shaft with a follow-up or tracking disk mounted for rotation about the vertical axis which carries a sensing means to sense the position of the disk relative to the gyroscope. A belt couples the tracking disk to the heading card with a motor drive connected to the belt and responsive to variations in the position of the tracking disk relative to the gyroscope for slaving the tracking disk to the gyroscope and for rotating the card proportional to the displacement of the housing relative to the gyroscope. A release means uncouples the heading card permitting rotation of the heading card relative to the gyroscope. In a further aspect, a free air driven gyro is provided in an air sealed cylindrical container with means for minimizing any perturbations which would be imposed upon the gyro by air flow.

In a further aspect of the invention, a flanged ring mounted on a barrel supporting the heading card is movable to control the coupling between the heading card and the tracking disk and to permit manual rotation of the card independent of the tracking disk.

In a further aspect, means are provided for selecting heading by rotation of the same control used for setting the heading card by providing a slip clutch between the heading marker.

In a further aspect, means are provided for setting the radio course by means of a second control knob-slip clutch combination.

BRIEF DESCRIPTION OF THE DRAWINGS

For a more complete understanding of the present invention and for further objects and advantages thereof, reference may now be had to the following description taken in conjunction with the accompanying drawings in which:

FIG. 2 is a side view of one embodiment of the invention;

FIG. 5 is a top view of the unit of FIG. 2;

FIG. 6 is a view of the side of the unit opposite that shown in FIG. 2;

FIG. 7 is a bottom view of the unit of FIG. 2.

FIG. 1

Referring now to FIG. 1, the face of the directional gyro unit comprising the present invention has been illustrated. The display is conventional and heretofore known. It involves a housing 10 which in one embodiment was adapted to fit into a three inch by three inch opening in an aircraft instrument panel. Prominent on the face of the instrument is a heading card 12 in the form of a flat ring. The card is adapted to be rotated as indicated by arrow 14. The card is marked with legends, N, E, S and W, the four points of the compass and bears graduations similar to a compass with ten degree points so marked.

Figure 1:
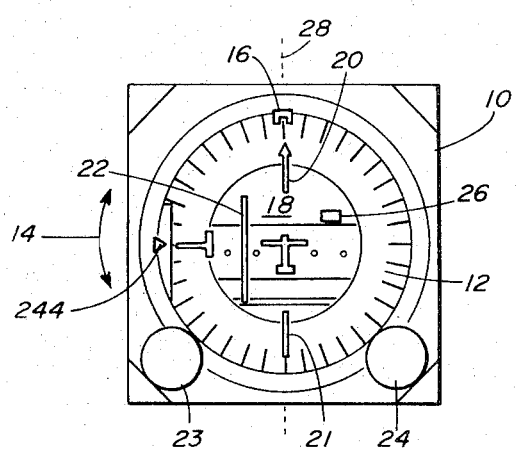
FIG. 1 is a view of the instrument face of the present invention.

A command heading marker 16 is mounted adjacent the periphery of the card 12. As will be described, marker 16 is mounted on structure permitting it to be rotated relative to card 12 or with card 12.

A radio display unit 18 centered in card 12 is rotatable relative to card 12 or with card 12 as will later be shown. The radio display unit 18 comprises a central disk which carries upper and lower pointers 20, 21 forming an omni bearing selector. Pointers 20, 21 are aligned and serve to provide an indication as to the selection of a desired radio controlled course. A meter movement is provided to support and control the position of a center segment 22. When the segment 22 is in alignment with the segments 20 and 21 when the aircraft is in the omni mode or the localizer mode, the aircraft is flying directly along the radio defined path. When the aircraft is displaced from the radio defined path, the segment 22 is displaced to the right or to the left of the center of the radio display in an amount dependent upon the extent of the aircraft displacement from the path.

Also on the radio display is a meter controlled indication of the direction of flight of the aircraft relative to a radio station when localizer mode indicating to the pilot that he is flying either toward or from the station. Operation in the omni mode is also signified by a legend appearing in window 26.

Two control knobs 23 and 24 are provided. Control knob 24 is associated with the heading card 12 and marker 16. Control knob 23 is associated with the radio display 18.

In accordance with the present invention, knob 24 may be rotated to set the heading marker 16 relative to the heading card 12. When marker 16 is moved, a pickoff is correspondingly rotated to induce an unbalance signal in an associated autopilot system which causes the plane to bank and turn until the aircraft flies a course indicated by the position of marker 16 on the heading card 12 with the card 12 and marker 16 stopping when marker 16 is at the vertical axis 28.

The knob 24 may be employed for a second adjustment. By pushing it towards the face of the instrument and rotating the marker 16 together with the heading card 12, the DG system may be set to correspond with a compass heading.

Knob 23 is rotated to set the radio course, that is to cause the pointer 20 to register at the desired heading of the radio defined path on the scale carried by the heading card 12. For example, in localizer mode, marker 16 would be set to the runway heading and the pointer 20 would be set to the same heading. The aircraft would then be caused to fly to and then along the localizer radio beam, flying the aircraft along a course until there is no offset or displacement in the segment 22 relative to pointers 20 and 21.

FIG. 2

Figure 2A:
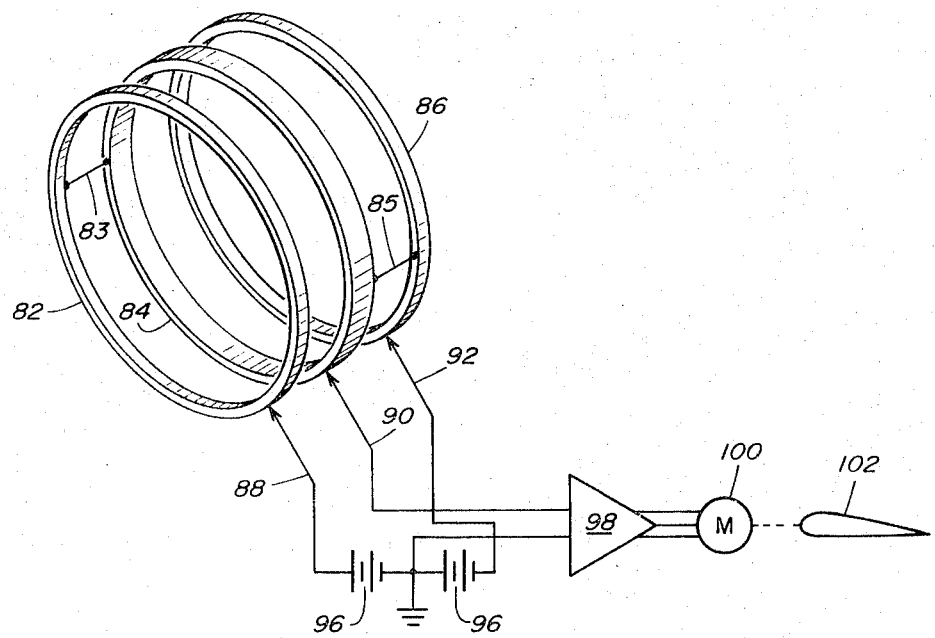
FIG. 2a is a perspective view of the pickoff with associated circuit therefor.

The system for accomplishing the foregoing function is illustrated in FIGS. 2–7. In FIG. 2 the system of the present invention is shown in the side view. Knob 24 is shown in the front of the face panel 30 which is adapted to be secured to the aircraft frame. The housing 10 is generally rectangular in shape and supports at the rear end thereof a vertical gyro assembly 32. The gyro 32 in this embodiment is an air driven gyro having air inlet and outlet ports 34 and 35. The gyro is provided with a belt driven tracking disk 36 which is provided with slip rings and is mounted for rotation on the vertical output axis of the gyro assembly 32. A brush support 38 is secured to housing 10 and extends above disk 36 and carries brushes for the transmission of signals and energizing current to and from a pickoff in the tracking disk 36. The tracking disk 36 is encircled and driven by a timing belt 40 which runs along the horizontal path to an idler roller 42, and then around a motor driven sprocket 44, and over a pair of idlers 48–50 which are mounted on a shaft 52. The shaft 52 is perpendicular to the axis of the gyro assembly 32.

The belt 40 then courses downward around a barrel 62 which supports the heading card 12 (not seen in FIG. 2) at its front end. Barrel 62 is smaller in diameter than disk 36. Barrel 62 has two coaxial large diameter rings 54 and 56 integral therewith and a smaller diameter ring 58 positioned between rings 54 and 56. A flanged ring 57 is mounted on barrel 62 adjacent to ring 56 and is rotatable on barrel 62. The flange on ring 57 is toothed to mesh with belt 40 and is of the same diameter as tracking disk 36.

Timing belt 40 has preferably a ribbed surface positively to mesh with the driver gear 44 with teeth on the periphery of the tracking disk 36 and with teeth on the flange of ring 57.

The drive motor 46 for the drive sprocket 44 is mounted in housing 10 with the motor shaft extending directly upward to support and drive sprocket 44. Idler 42 is adjustable in its position to tighten belt 40 by adjusting the position of the end of arm 59. By this arrangement rotation of motor 46 rotates tracking disk 36 and ring 57 on heading barrel 62 through equal angles.

Unbalance or error signals from a sensor in tracking disk 36 are employed in a servo loop to drive motor 46 to slave the tracking disk 36 to gyro assembly 32. As this is done, the motor 46 drives belt 40 causing the tracking disk 36 to follow and be maintained in a predetermined relation with respect to ring 57. Any movement of the tracking disk is accompanied by equal rotation of ring 57 on barrel 62. The front face of ring 57 and the rear face of ring 56 are mating clutch surfaces. With the clutch engaged, motion of ring 57 is transmitted to barrel 62 via ring 56, thus forcing barrel 62 to track the tracking disk 36. A flange 68 is pinned to shaft 60 and engages a spring 70, the rear end of which engages the inner race of a bearing 71 which supports the rear end of shaft 60. Spring 70 urges shaft 60 forward.

When this is the case, the heading card 12 on the front end of barrel 62 is rotated in synchronism with rotation of the tracking disk 36. When the clutch 56–57 is not engaged, then barrel 62 may be rotated independently of the tracking disk 36.

The clutch disks 54 and 56, together with disk 57, are shown in conjunction with three rollers operated by a bell crank 63. More particularly, a roller 64 is mounted on a shaft or pivot 65 which is mounted on the frame 10. Crank 63 also pivots on shaft 65. Roller 64 is positioned in the space between rings 54 and 56, both of which are integral with barrel 62. Preferably there is a very slight clearance (0.001 inch) between the periphery of roller 64 and the confronting surfaces of rings 54 and 56. Roller 64 is mounted for free rotation on shaft 65.

A second roller 66 is mounted on a shaft 67 which in turn is mounted on bell crank 63. The edge of roller 67 is positioned to engage the rear surface of the flanged ring 57. A spring 70a is secured at one end to the rear end 69 of bell crank 63 and at the other end to frame 10 so that the bell crank 63 normally is biased in a clockwise direction forcing the flanged ring 57 into engagement with ring 56. By this means the barrel 62 rotates with the flanged ring 57 and is forced to track the tracking ring 36.

A short cylinder 72 is mounted on the front of barrel 62. A flange 74 is formed at the rear end of cylinder 72. The rear surface of flange 74 and the front surface of ring 54 form a second slip clutch. The friction between cylinder 72 and barrel 62 normally is adequate to cause the cylinder 72 to rotate with and thus follow barrel 62. However, when bell crank 63 is rotated counterclockwise, a third roller 76 mounted on the front of bell crank 63 is forced into contact with the rear surface of flange 74, forcing flange 74 and ring 54 together while releasing pressure between rings 56 and 57. A flange 78 on shaft 60 is positioned adjacent to the lower end 80 of bell crank 63. When knob 24 is pushed in, it releases the clutch 56, 57 and further increases the friction in clutch 54, 74. A sprocket 81 on shaft 60 is belted to a toothed section on the front end of cylinder 72. Thus, when knob 24 is depressed and rotated, the cylinder 72 is rotated and barrel 62 is rotated by an equal amount because of engagement of clutch 54, 74. This rotates the heading card on the front end of cylinder 62. This clutching arrangement permits the selection of a new heading through use of the autopilot associated with the system by merely rotating cylinder 72. The linkage also permits rotation of barrel 62 to reset the system to a compass when desired.

Cylinder 72 is encircled by three rings. The front ring 82 is a slip ring. The center ring 84 is a continuous potentiometer. The rear ring 86 is a slip ring.

Rings 84–86 form a pickoff for the autopilot system. The circuit in which they are employed is diagrammatically illustrated in FIG. 2a wherein the rings are shown separate and apart from their mounting. Ring 82 is a continuous conductor. It is connected by way of a bar 83 to a point on ring 84 which is a resistance element of the type to serve as a potentiometer element. Ring 86 similarly is a continuous conductor connected by a bar 85 to a point on ring 84 which is diametrically opposite to the connection of bar 83.

Three fixed wipers 88, 90 and 92 engage rings 82, 84 and 86, respectively. Wipers 88 and 92 are connected in circuit with a center tap battery 96. The center tap of battery 96 is connected to ground. The wiper 90 associated with ring 84 is connected to an amplifier 98 whose output is applied to a motor 100 to control ailerons represented by the element 102. When wiper 90 is midway between the points of connection of bars 83 and 85, the system is nulled and the signal to amplifier 98 is zero and motor 100 is not energized. However, if the cylinder 72, FIG. 2, is rotated, ring 84 moves relative to wiper 90, thus unbalancing the servo system in an amount proportional to the rotation of cylinder 72 and in a sense dependent upon the direction of rotation of cylinder 72. This unbalance causes the motor 100 to operate the control surfaces to bank and turn the aircraft until the signal from ring 84 is again null. This is accomplished by motor 46 driving the tracking disk 36 to follow the gyro 32 as the plane turns. Disk 36 is coupled to barrel 62 by belt 40, flanged ring 57 clutched to ring 56 which turns barrel 62. Barrel 62 carries cylinder 72 with it, moving ring 84 relative to wiper 90. This continues until the signal to amplifier 98 is zero. The drive for motor 100, shown in simplified form, preferably will be of the type shown in U.S. Pat. No. 3,465,218.

FIG. 3

Figure 3:
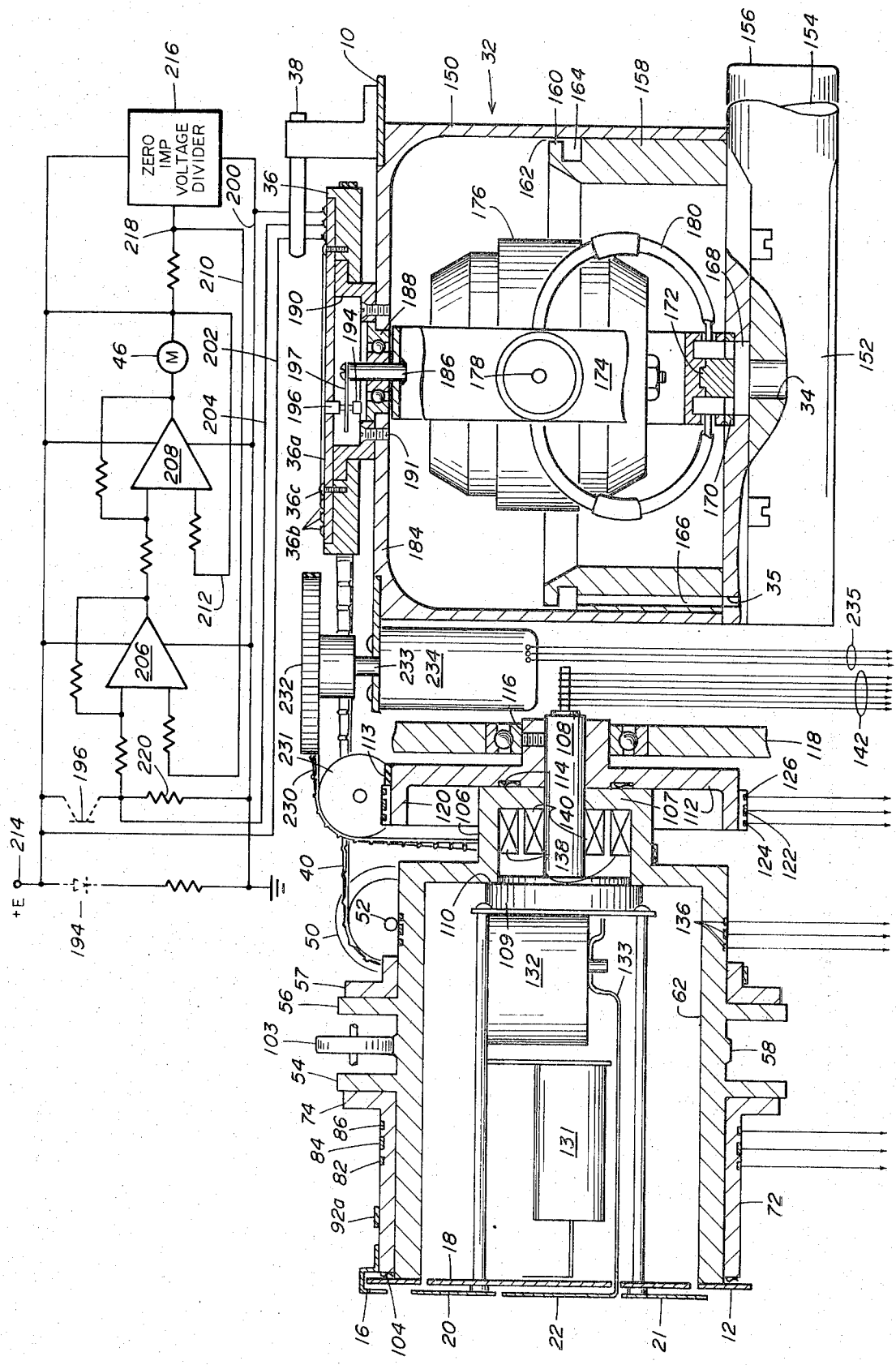
FIG. 3 is a fragmentary diagrammatic representation of elements of FIG. 2.

Certain portions of the system are shown diagrammatically in FIG. 3 which is presented in order to assist in understanding the structure shown in FIG. 2.

Heading barrel 62 in this embodiment is an elongated cylinder open at the front end thereof and supporting heading card 12. Ring 54 is engaged by two rollers (not shown in FIG. 3 but spaced 120° apart) beneath barrel 62 to maintain it in a predetermined position within housing 10. A third roller 103 engages ring 58 at the top to provide the three point support for barrel 62. Cylinder 72 is rotated by belt 92a which meshes with gear 81 on shaft 60, FIG. 2. A wave washer 104 positioned between the rear surface of bearing card 12 and the front end of cylinder 72 urges flange 74 at the rear of cylinder 72 against ring 54 to provide a low torque slip clutch coupling between cylinder 72 and ring 54.

Barrel 62 has a rear closure with a coaxial cylindrical extension 106 which in turn is closed by a disk 107. A center hole through disk 107 receives a shaft 108 which serves to support the radio display unit 18.

The radio display unit 18 is positioned inside the heading barrel 62 and is integral with shaft 108. Near the rear end of unit 18 is a disk 109 which thus closes extension 106. The bearing surfaces between disk 109 and the mouth of extension 106 forms a slip clutch 110. A disk 112 is fixed on shaft 108 back of closure 107. A wave washer 114 urges the radio display unit 18 rearward in heading barrel 62. Shaft 108 is journaled in bearing 116 in a plate 118 extending across the housing 10.

Integral with disk 112 is a short cylinder 120 which supports a potentiometer ring 122 and two slip rings 124 and 126. The wipers for the potentiometer ring and slip rings 122, 124 and 126 are insulated from and supported by housing 10. A positive voltage is applied to ring slip 126 and a negative voltage to ring slip 125 in the conventional manner described in U.S. Pat. No. 3,648,230. Voltage picked off from potentiometer ring 122 is representative of the angular position of meter 132 and radio display unit 18.

The radio display per se is not new in that heretofore, a meter such as a meter 132 has been provided. Meter needle 133 extends through a slot 134 in the face of display unit 18 and outer segment 22.

In the present case, however, circuits are provided for the radio display via three slip rings 136 mounted on the exterior of the heading drum 62. They provide for electrical circuits leading to magnetic coils 138 on the interior of the cylindrical extension 106. Cooperating coils 140 are mounted on shaft 108. Coils 138 and 140 are shown to represent a synchro resolver of conventional nature. The radio guidance unit usually is set by the synchro resolver to an angle corresponding to the magnetic course or heading to be followed with the heading card 12 set to correspond with a magnetic compass heading. The resolver is then employed in the known manner to fly the aircraft to the desired course. Thus, the coils 138 and 140 are shown schematically.

A set of slip rings 142 on the end of the shaft 108 provide for circuits which extend to meters 131 and 132 and to coil 140. Thus, six slip rings are provided in set 142.

The gyro 32 is illustrated in FIG. 3 as comprising a cylindrical housing 150 having a bottom closure 152 that has an air input tube 154. Cylinder 150 is thin walled and includes a cylindrical insert 158 in the bottom which is thick walled. The upper end of the insert is inwardly tapered at section 160 and is of smaller outer diameter than the inner diameter of cyliner 150 so that there is thin annular passage 162 leading to an annular chamber 164. Chamber 164 is connected as by way of the longitudinal passage 166 to an exhaust tube 156. Pressurized air to drive the gyroscope in cylinder 150 enters by way of tube 154 which leads to a central passageway 168. A perforated closure member 170 in the bottom of cylinder 150 is provided with a support pin 172 for an outer gimbal 174 which supports gyro 176. Gyro 176 is mounted on gimbal 174 for rotation about axis 178. Air flows around pin 172 and thence by way of tubes 180 to the shaft 178 to drive a rotor in the gyroscope 176.

Tracking disk 36 is positioned above the upper closure member 184 of cylinder 150. A pin 186 is fixed in a hole in the upper segment of gimgal 174. Pin 186 is journaled in a bearing 188 which is mounted in closure member 184. A flanged cylinder 190 is mounted on top of closure member 184, secured by screws 191. Tracking disk 36 has an upper plate 36a on which slip rings 36b are mounted. Disk 36 and plate 36a are coupled together by fasteners 36c so that disk 36 is captured on the flanged cylinder 190 and may rotate thereon when driven by belt 40.

A light source 194 is mounted on a rod 194a depending from tracking disk 36a and preferably is a light emitting diode. A photodiode 196 is mounted on plate 36a on the side of an opaque vane 197 opposite source 194. Vane 197 is carried on the end of pin 186 and moves with gyro gimbal 174.

Three wipers are mounted on support 38 to provide for two circuits leading, by way of the three slip rings on plate 36a, to conductors 200, 202 and 204.

An error signal, produced upon displacement or movement of the outer gimbal 174 relative to the tracking disk 36, is employed to control motor 46. The servo circuit for motor 46 includes operational amplifiers 206 and 208. The circuit for driving motor 46 employs regenerative feedback to amplifier 208 by way of channel 210 and feedback to amplifier 206 by way of feedback path 212. Conductor 202 is common to the light source 194, the photodiode 196, and the positive terminal of a current source 214. Source 214 supplies operational amplifier 206 and operational amplifier 208 as well as a zero impedance voltage divider 216. At point 218 there is provided a voltage equal to one-half the voltage of the source 214. Line 200 is connected to ground and, by way of resistance 220, to conductor 204 which leads to the input of the amplifier 206. The circuit is operated such that the voltage at the output of amplifier 206 is proportional to the velocity of the motor 46. The amplifier 208 in this circuit operates as a velocity bridge equivalent.

FIG. 4

Figure 4:
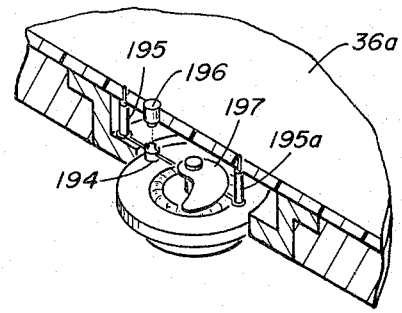
FIG. 4 is a partial perspective view of the tracking disk.

In FIG. 4 the vane 197 mounted on the top of the pin 186 on the outer gimbal 174 is shown in relation to the light source 194. The detecting photodiode 196 is mounted in disk 36. The light sensitive pickoff thus operates on an edge of vane 197 to slave the disk 36 to gimbal 174.

The diode 194 is shown supported on its own leads from two posts 195 and 195a and is so positioned to illuminate detector 196. Vane 197 thus is positioned to interrupt light reaching detector 196 from source 194.

As will be seen in FIG. 3 there are four belts operating in the system. At the front heading belt 92a is coupled to shaft 60. Gyro belt 40 couples the clutch ring 57 to the tracking disk 36. Course belt 113 connects the disk 112 to a pulley on shaft 23a, permitting rotational adjustment through actuation of knob 23 of the radio display unit 18.

A fourth belt 230 encircles the cylindrical extension 106 of barrel 62 and passes over a pair of idlers such as idler 231 and thence around a pulley 232. Pulley 232 is mounted on a shaft 233 of a synchronous control transformer of resolver 234. Belt 230 is a slaving belt which slaves the cylinder 62 to the resolver 234. Resolver 234 then provides an output on channel 235 indicative of heading. This signal may be compared with a flux gate and any error signal used to excite a torquer to slave a gyro to the flux gate. No such provision is included herein. Rather, provision is made for generating the heading information. It may then be used as above noted or in any other manner desired.

In FIG. 5 the top view of the unit is shown. In this figure, the belt 92a is shown encircling the cylinder 72 to couple the same to the sprocket 81. The slip rings 82, 86 and the potentiometer 84 are shown encompassing the cylinder 72 with the flange 74 adjacent the ring 54.

The top roller 103 is supported by a bracket 103a which spans the top of the frame 10 and is secured thereto as by screws 103b.

Rings 56 and flange 57 are shown with their confronting faces positioned together. Belt 40 encircles barrel 62 in the toothed track 62a. Idlers 48 and 50 are supported by shaft 52 which is journaled in bearing block 52a at the ends thereof.

Idlers 231 are supported on shaft 231a and supports belt 230 as it courses around the pulley 232. The pulley 232 is mounted on shaft 233 as above explained to drive the synchro controlled transformer 234.

Idler 42 supported on adjustable arm 59, drive pinion 44, and tracking disk 36 are shown in their relative positions. Brush support arm 28 extends above tracking disk 36 to provide for circuit extending from the slip rings on disk 36.

FIG. 6 illustrates the left side of the unit. In this view the shaft 23a is shown as it supports pinion 113a over which belt 113 passes and from which belt 113 extends to encompass the course command pulley 112.

Also shown in FIG. 6 is a glide slope indicating meter 240 which has a meter arm or needle 242 extending to the front face of the unit to provide a glide slope indication 244, FIG. 1. Such provisions are conventional and are included in the present system.

FIG. 7 is a bottom view of the system. The two lower support rollers for barrel 62, namely rollers 248 and 250, are mounted on shafts 23a and 60, respectively. The rollers 248 and 250 are flanged to prevent movement of the barrel 62 forward. The bearing by which roller 248 is mounted on shaft 23a is pinned to shaft 23a so that roller 248 may not move longitudinally.

The roller 250 is mounted slidably on a shaft 60. The shaft 60 must be moved axially in order to move flange 78 against the lower end 80 of the clutch bell crank best shown in FIG. 2. In order to accommodate such movement, a disk 252 is keyed to shaft 60 and is provided with peripheral holes. A plurality of rods, such as rod 254 extend from pinion 81 and bear against the inner race of the bearing on which roller 250 is mounted. Rods 254 slide through the peripheral holes in disk 252. Pinion 81 while not keyed to shaft 60 is prevented from moving axially because of a bearing surface 256 which contacts the race of the bearing (not shown) in the front panel member 258. By this means the flange roller 250 is prevented from moving towards the front of the unit and thus serve to position the barrel 62, preventing forward movement thereof at the same time.

Motor 46 is shown located above a pressure sensitive switch unit 260. Switch 260 provides the pilot with an indication when air pressure leading to the gyro 32 is low or off. Synchro resolver 234 is shown centered in the housing 10.

Having described the invention in connection with certain specific embodiments thereof, it is to be understood that further modifications may now suggest themselves to those skilled in the art and it is intended to cover such modifications as fall within the scope of the appended claims.

What is claimed is:

1. A directional gyro indicator for aircraft comprising:
   a. a generally horizontal barrel having a heading card normal to the barrel axis and located at the front end of said barrel,
   b. a directional gyro supported behind said barrel and having an outer gimbal disposed on a vertical axis,
   c. a tracking disk rotatably mounted on said vertical outer gimbal axis of said gyro,
   d. pickoff means for detecting the angular displacement between said tracking disk and said outer gimbal and for producing an error signal indicative of such displacement,
   e. toothed belt transmission means coupling said tracking disk and said barrel for equal rotation of said disk and barrel without relative slippage therebetween,
   f. servo motor drive means for said transmission means responsive to the error signal from said pickoff means for slaving said tracking disk to said gyro, and
   g. friction clutch means in said barrel for decoupling said heading card from said tracking disk to facilitate setting said card relative to said tracking disk.

2. A directional gyro indicator for aircraft comprising:
   a. a generally horizontal barrel having a heading card normal to the barrel axis and located at the front end of said barrel,
   b. a directional gyro supported behind said barrel and having an outer gimbal disposed for rotation on a vertical axis,
   c. a tracking disk rotatably mounted on the vertical outer gimbal axis of said gyro and directly above said outer gimbal,
   d. pickoff means for detecting the angular displacement between said tracking disk and said outer gimbal and for producing an error signal indicative of such displacement,
   e. a toothed belt coupling said tracking disk and said barrel for concomitant equal rotation of said disk and barrel without relative slippage therebetween,
   f. servo motor drive means for said toothed belt responsive to the error signal from said pickoff means for slaving said tracking disk to said gyro, and
   clutch means in the barrel for selectively decoupling said heading card from said tracking disk to facilitate setting said card.

3. The combination set forth in claim 2 wherein a synchro component is mounted with its axis intersecting the axis of said barrel, and
   means including a belt couples said barrel to said synchro component for equal rotation of said barrel and said synchro component to produce an output signal indicative of the position of said card.

4. The combination set forth in claim 2 wherein said barrel rotatably and concentrically supports a second cylinder and a heading marker is mounted on said second cylinder and positioned for rotation with said second cylinder around the periphery of said heading card.

5. The combination set forth in claim 4 wherein said second cylinder is provided with a pickoff for developing an azimuth error signal proportional to rotation of said second cylinder relative to said barrel.

6. The combination set forth in claim 4 wherein two clutches are positioned between said belt and said second cylinder with said barrel having structure forming elements common to both clutches whereby said heading marker may be moved both with said heading card independent of said belt and independent of said heading card and said belt.

7. The combination set forth in claim 2 wherein the contact surfaces of said clutch are confronting surfaces of radial flanges on each of said barrel and said first cylinder.

8. The combination set forth in claim 7 wherein resilient means normally bias said flanges together and wherein a manually operable linkage is provided to oppose said bias to decouple said flanges.

9. A directional gyro indicator for aircraft comprising:
   a. a generally horizontal barrel having a radial flange intermediate its length and a heading card on the front end of said barrel,
   b. a directional gyro supported behind said barrel and having an outer gimbal disposed on a vertical axis,
   c. a tracking disk rotatably mounted on said vertical outer gimbal axis of said gyro,
   d. pickoff means for detecting the annular displacement between said tracking disc and said outer gimbal and for producing an error signal indicative of such displacement,
   e. a first flanged cylinder mounted on said barrel with and having a flange surface facing one surface of said radial flange on said barrel,
   f. compression means normally biasing said surfaces together to frictionally couple said cylinder to said barrel,
   g. a toothed belt coupling said tracking disk and said first flanged cylinder for equal rotations of said disk and cylinder without relative slippage therebetween,
   h. a servo motor drive for said toothed belt responsive to the error signal from said pickoff means for slaving the tracking disk to said gyro, and i. a rotatable slidable shaft mounted parallel to the axis of said barrel coupled to said compression means to declutch the flanges upon sliding movement of said shaft and coupled to said barrel to rotate said barrel upon rotation of said shaft thereby to effect setting of the heading card.

10. The combination set forth in claim 9 in which a second flanged cylinder is coaxially mounted on said barrel and is friction coupled thereto for rotation with said barrel, and wherein a belt couples said shaft to said second cylinder for rotation of said second cylinder relative to said barrel when said shaft is not axially moved to declutch said barrel from said first cylinder and to rotate said barrel with said second cylinder when said shaft is rotated following axial movement to declutch said barrel from said first cylinder.

11. The combination set forth in claim 10 wherein said compression means comprises a bell crank having a roller thereon resiliently biased into engagement with a face of the flange on said first cylinder to move said flange into contact with the flange on said barrel.

12. The combination set forth in claim 10 wherein a fixed roller engages the periphery of the flange on said barrel to oppose clutching forces applied by said biased roller on said crank.

13. The combination set forth in claim 1 wherein a single bearing supports said barrel at the rear end thereof and three angularly dispersed rollers support and position said barrel by surface contact therewith substantially forward of said rear end.

14. A directional gyro aircraft instrument which comprises:
  a. a heading card unit having a coaxial drive surface and having an axis displaced substantially from vertical,
  b. means for supporting said heading card unit for rotation about the heading card axis,
  c. a gyro having an output axis intersecting the axis of said card unit,
  d. a tracking disk of the same diameter as said drive surface of the heading card unit with a gyro pickoff for sensing the position of said disk relative to said gyro and for producing an error signal indicative of said relative position,
  e. a servo motor actuated in direction and magnitude in accordance with the sense and magnitude of the error signal from said pickoff,
  f. a belt driven by said servo motor and passing around said tracking disk and said drive surface of the heading card unit to slave said disk to said gyro, and
  g. manual control means for selectively rotating said heading card unit both independently of said tracking disk and in conjunction with said tracking disk.

15. The combination set forth in claim 14 wherein said manual control means is belted to said heading card unit and is adapted to rotate said barrel.

16. A direct readout directional gyro for aircraft which comprises:
  a. a housing adapted to be mounted in an aircraft instrument panel and having an exposed heading card structure which is rotatable about a predetermined nonvertical axis,
  b. a gyroscope in said housing and having a vertical output shaft,
  c. a tracking disk mounted for rotation about the axis of said vertical shaft and carrying sensing means to sense the position of said disk relative to said gyroscope,
  d. a belt coupling said tracking disk to said heading card structure,
  e. a motor drive means connected to said belt and responsive to variations in said position of the tracking disk relative to the gyroscope for slaving said tracking disk to said gyroscope and for rotating said card proportional to the displacement of said heading card structure relative to said gyroscope,
  f. clutch means for decoupling said belt from said heading card structure, and
  g. means for rotating said heading card relative to said tracking disk.

* * * * *